United States Patent [19]

Meeker et al.

[11] Patent Number: 4,632,460
[45] Date of Patent: Dec. 30, 1986

[54] SEAT BELT FASTENER

[75] Inventors: Paul K. Meeker, Kent; Mark A. Sedlack, Cuyahoga Falls, both of Ohio

[73] Assignee: Gerber Products Company, Fremont, Mich.

[21] Appl. No.: 786,408

[22] Filed: Oct. 10, 1985

[51] Int. Cl.⁴ .................................. B60R 21/00
[52] U.S. Cl. .................................. 297/467; 297/216
[58] Field of Search ............ 297/467, 468, 156, 162, 297/271, 216; 280/801; 24/634

[56] References Cited

U.S. PATENT DOCUMENTS

| | | | |
|---|---|---|---|
| 612,310 | 10/1898 | Crigler | 292/156 X |
| 3,031,229 | 4/1962 | Symbaluk | 297/467 |
| 3,728,764 | 4/1973 | Carter | 297/468 |

Primary Examiner—James T. McCall
Attorney, Agent, or Firm—Townsend and Townsend

[57] ABSTRACT

A latch mechanism is designed to secure a safety belt to the upper surface of a seat at any of a plurality of positions spaced longitudinally along the seat surface. The mechanism includes a loop extending downward from the end of the safety belt to fit into any of a series of slots arranged in a longitudinal row along the seat surface. Below the seat surface is a longitudinal channel retaining a plunger. A longitudinal row of hooks, each capable of engaging the seat belt loop, extends upward from the plunger, having the same number and spacing as the slots. The plunger is capable of sliding longitudinally inside the channel, but is biased to a position in which the hooks are aligned with the slots. Retraction of the hooks and hence release of the seat belt loop is achieved by manual manipulation of the plunger. Proper selection of a slot for insertion of the seat belt loop will comfortably yet securely retain an infant or toddler within a range of body sizes.

7 Claims, 5 Drawing Figures

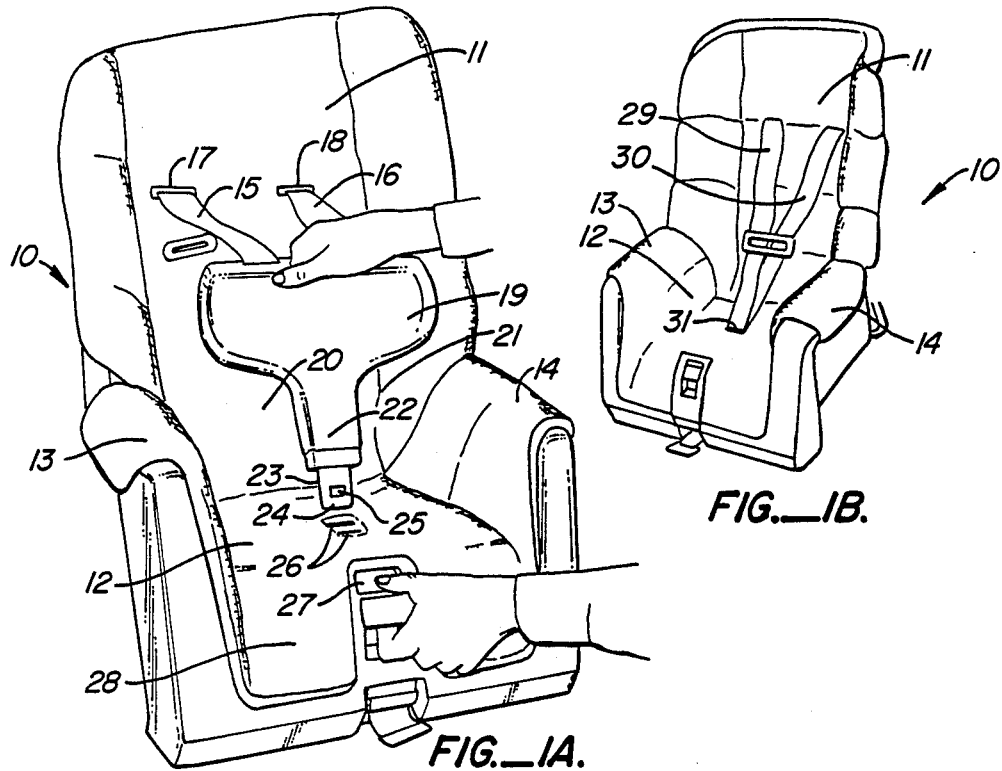
FIG._1A.
FIG._1B.
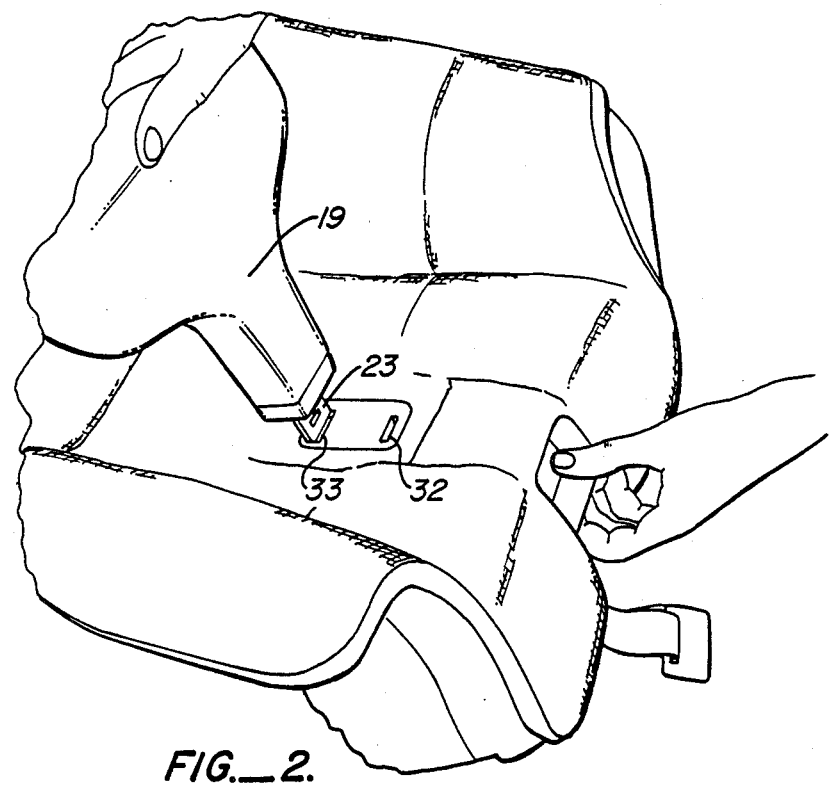
FIG._2.

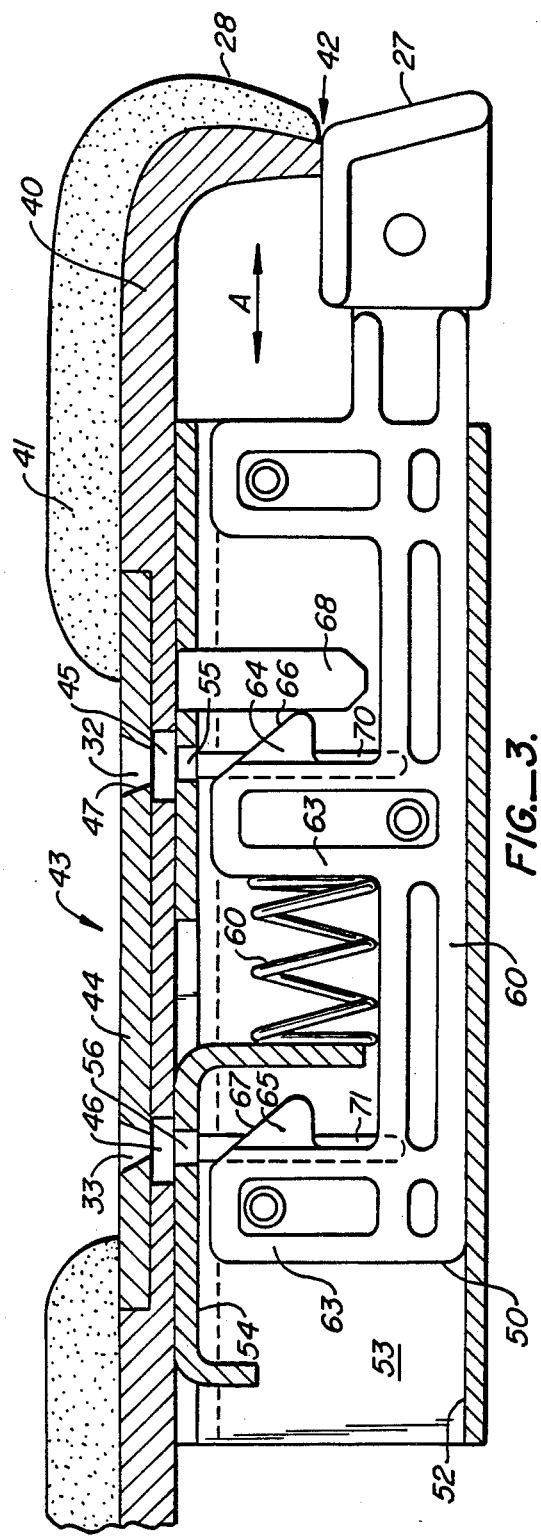
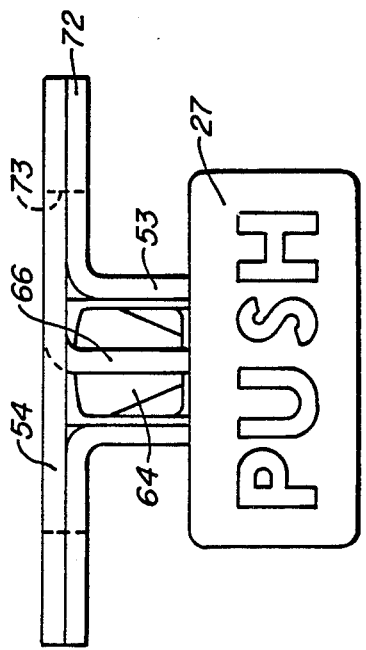

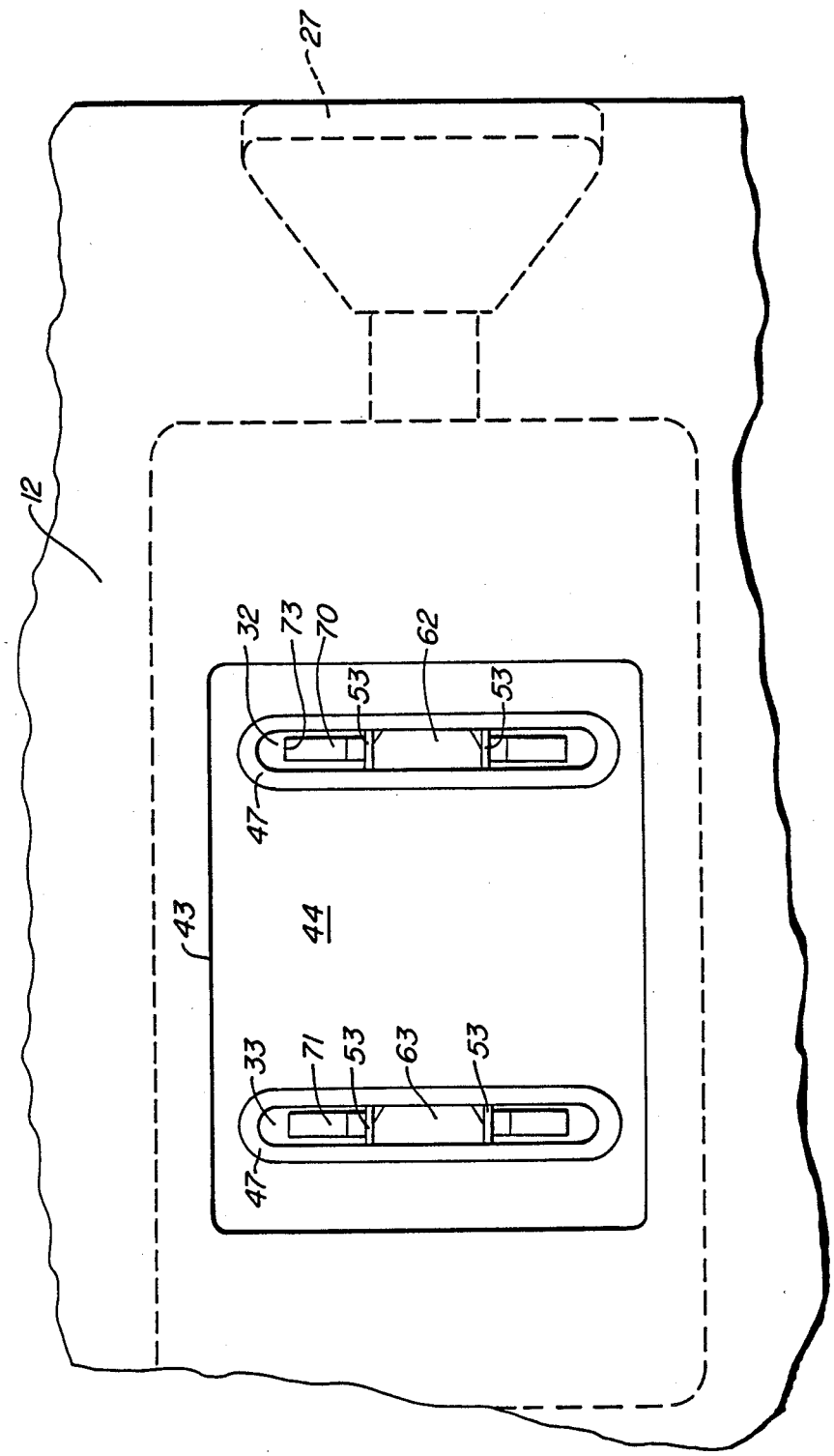

SEAT BELT FASTENER

BACKGROUND OF THE INVENTION

This invention relates to seat belt latches, and particularly to latches in infant carriers or baby seats.

Infant carriers or baby car seats of the type which can be secured to the seat of an automobile contain retaining straps extending from the back of the seat behind the shoulders of the baby, down over the baby's torso to join in the pelvic area between the baby's legs, and finally terminating in a buckle in the seat. The present invention has been devised to provide flexibility to the buckle so that the same car seat and safety belt may be used for children of various sizes, ranging from infants to toddlers.

SUMMARY OF THE INVENTION

A novel latch mechanism with multiple positions is provided, which permits a loop extending from the end of the safety belt to be locked into the seat of the carrier at any of a series of points, all of which are engaged or released by a single plunger. The plunger in this invention resides in a longitudinal channel in the seat, and contains a longitudinal row of hooks, each capable of engaging the seat belt loop. The seat itself contains a row of slots directly above the channel to mate with the hooks. The plunger is capable of being manipulated inside the channel in the longitudinal direction, but is biased to a position in which the hooks are aligned with the slots. Proper selection of the slot will secure the safety belt to the seat in a location which comfortably secures an infant or toddler within a range of body sizes.

BRIEF DESCRIPTION OF THE DRAWINGS

FIG. 1A is a perspective view of one example of a safety belt to which the latch mechanism of the present invention may be applied.

FIG. 1B is a perspective view of a second example of a safety belt to which the latch mechanism of the present invention may be applied.

FIG. 2 is an enlarged perspective view of the safety belt and latch mechanism of FIG. 1A.

FIG. 3 is a cross-section of a latch mechanism according to the present invention.

FIG. 4 is a front elevation of the plunger and channel portions of the latch mechanism shown in FIG. 3.

FIG. 5 is a top view of the seat shown in FIGS. 1A and 1B incorporating the latch mechanism of FIG. 3.

DETAILED DESCRIPTION OF THE INVENTION AND PREFERRED EMBODIMENTS

Examples of different types of safety belts to which the latch mechanism of the present invention may be applied are those shown in FIGS. 1A and 1B, respectively. The safety belt in each case is secured to an infant carrier 10 which consists of a back 11 and a seat 12, with side arms 13, 14. The safety belt in FIG. 1A contains a pair of straps 15, 16 which pass over the shoulder of the baby occupant through two slots 17, 18 in the back 11. The straps are commonly joined to a shield 19 having leg openings 20, 21 on either side. The narrow portion 22 of the shield passes between the occupant's legs. A tongue 23 extends downward from the end of this portion, terminating in a loop 24 forming an aperture 25. The tongue 23 fits into any one of a series of slots 26 in the seat, where it is locked into place. Release of the lock is achieved by pressing a button 27 protruding from the front edge 28 of the seat.

The belt in FIG. 1B is shown in the locked position. Here, however, the belt consists of two straps 29, 30 extending from the seat back 11 to a common point 31, with no shield in between. The latching mechanism itself is the same as that in the apparatus shown in FIG. 1A. These are mere examples of safety belts on which the latch mechanism of the present invention may be constructed. Many other possibilities exist.

A closer view of the slots 26 may be seen in FIG. 2. Here the slots are two in number, comprising a forward slot 32 and a backward slot 33. This figure shows the shield 19 of the embodiment of FIG. 1A being held so that its tongue 23 is about to be inserted in the backward slot 33, which is positioned to safely secure an infant in the carrier. The forward slot 32 is positioned to accommodate a larger child, such as a toddler.

A cross-section of the latch mechanism located inside the seat is shown in FIG. 3. The seat consists of a rigid shell 40 coverd by a cushion material 41. The shell and cushion material have an opening 42 along the front edge 28 of the seat. The button 27 by which the latch mechanism is operated protrudes through this opening, which permits the button to move in and out. A gap 43 in the cushion material 41 at the upper surface of the sear provides access to the forward and backward slots 32, 33 through which the tongue extending downward from the safety belt is inserted. In the embodiment shown, slots are in a molded plate 44 resting on top of the shell 40, for purposes of convenience and manufacture. These slots are aligned with holes in the shell 45, 46 providing free passage to the latch mechanism underneath. The slots are manufactured with sloping sides 47 to facilitate insertion of the tongue.

The latch mechanism itself consists of a plunger 50 inside a channel 51 comprised of a bottom wall 52, side walls 53, and an upper wall 54. Slots 55, 56 in the upper wall are aligned with the slots 32, 33 in the exposed plate 44, permitting passage of the tongue extending from the safety belt into the interior of the channel. The plunger 50 is movable in the longitudinal direction, indicated by the two-way arrow A, and is biased by a spring 60. The plunger consists of a longitudinal shaft 61 from which a pair of hooks 62, 63 extend upward. Each hook has a forward protruding tip 64, 65 which engages the loop at the end of the tongue when the parts are joined. The spring 60 serves to bias the plunger toward the position shown, whereby the hooks 64, 65 are aligned with the slots 32, 33, retaining the tongue in whichever slot it has been inserted into. It will be noted that the upper surface 66, 67 of the tip of each hook is sloped downward, so that when the tongue is inserted in one of the slots 32, 33 and pushed downward, it forces the hook tip and consequently the entire plunger 50 backward. When the aperture is level with the hook tip, the spring 60 causes the hook tip to snap into engagement, thereby locking the tongue in place.

The embodiment shown in FIG. 3 further includes a stop 68 in the form of a finger extending downward from the upper wall 54 of the channel. The stop 68 blocks the tip 64 of the forwardmost hook 63, thereby limiting the travel of the plunger 50 in the forward direction (i.e., to the right in the view shown in the drawing). The position of this stop 68 is selected such that it limits the plunger's travel at a point where the sloped upper surfaces 66, 67 are still below the slots 32, 33.

A further feature of this embodiment are lateral guides 70, 71 which control the position of the tongue as it is inserted into the channel, preventing if from slipping longitudinally. In the embodiment shown, the tongue is wider than the channel, and these guides are slots in the side walls 53 of the channel.

For structural strength, the plunger may be constructed of a metallic core, such as steel, covered by a shell of material which slides easily, such as nylon.

A front view of the plunger and channel alone is shown in FIG. 4. This is an end view from the front of the button 27. The side walls 53 are bent outward at the top to form a flange 72 for mating with the upper wall 54. The lateral guide slots 70, 71 shown in FIG. 3 extend into the flanges 72 a short distance 73. Also visible in this view is the forwardmost hook 64 and the stop 66 which retains the plunger inside the channel.

A top view of the slot arrangement is shown in FIG. 5, which shows the seat 12 of the carrier, the gap 43 which provides access to the molded plate 44, and the two slots 32, 33 providing the two latch positions. Also shown are the hooks 62, 63 on the plunger, the side walls 53 of the channel, and the lateral guide slots 70, 71.

The foregoing description is offered for illustrative puposes only. Numerous modifications and variations may be readily apparent to those skilled in the art, while still falling within the spirit and scope of the invention as claimed hereinbelow.

What is claimed is:

1. A multiposition latch for securing a safety belt to a seat, comprising:
   a tongue extending from said safety belt, terminating in a loop;
   a plunger containing a longitudinal row of hooks which extend upward, each said hook adapted to engage said loop;
   a longitudinal channel in said seat to receive said plunger;
   a plurality of slots in said seat opening into said channel, each said slot adapted to receive said tongue, said slots equal in number and spacing to said hooks; and
   means for biasing said plunger to a position in which said hooks are aligned with said slots.

2. A multiposition latch in accordance with claim 1 in which said hooks are pointed toward the front of said seat and said biasing means is a spring biasing said plunger toward the front of said seat.

3. A multiposition latch in accordance with claim 1 further comprising a button on the front end of said plunger and accessible through an opening in the front edge of said seat to permit manipulation of said plunger in said channel.

4. A multiposition latch in accordance with claim 1 further comprising transverse guides in said channel below each said slot to guide the side edges of said tongue.

5. A multiposition latch in accordance with claim 1 further comprising a stop inside said channel to limit the travel of said plunger.

6. A multiposition latch in accordance with claim 1 in which the surface of each said hook beneath each said slot slopes downward to yield upon insertion of said tongue and thereby cause retraction of said plunger.

7. A multiposition latch for securing a safety belt to a seat, comprising:
   a tongue extending from said safety belt, terminating in a loop;
   a plunger containing a longitudinal row of hooks extending upward and pointed toward the front of said seat, each said hook adapted to engage said loop;
   a longitudinal channel in said seat to receive said plunger, said longitudinal channel containing transverse guides to guide the insertion of said tongue;
   a plurality of slots in said seat opening into said channel, each said slot adapted to receive said tongue, said slots equal in number and spacing to said hooks;
   a spring inside said channel biasing said plunger toward the front of said seat; and
   a stop inside said channel limiting the forward travel of said plunger at a point where said hooks are aligned with said slots.

* * * * *